United States Patent [19]
Garrett et al.

[11] Patent Number: 5,795,370
[45] Date of Patent: Aug. 18, 1998

[54] CONTROLLING ATMOSPHERES IN CONTAINERS

[75] Inventors: Michael E. Garrett, Woking, England; Norberto Lemcoff, Livingston, N.J.

[73] Assignee: The BOC Group plc, Windlesham, England

[21] Appl. No.: 667,151

[22] Filed: Jun. 20, 1996

[30] Foreign Application Priority Data

Jun. 28, 1995 [GB] United Kingdom .................. 9513111

[51] Int. Cl.$^6$ ................................................ B01D 53/047
[52] U.S. Cl. .................. 96/130; 96/132; 96/133; 96/144
[58] Field of Search ............ 95/98, 100–105, 95/121, 130, 139, 144; 96/130–133, 143; 426/312, 319, 418, 419

[56] References Cited

U.S. PATENT DOCUMENTS

| | | | |
|---|---|---|---|
| 3,981,698 | 9/1976 | Leppard | 95/119 |
| 4,228,197 | 10/1980 | Means | 426/419 |
| 4,337,276 | 6/1982 | Nakamura et al. | 426/419 X |
| 4,477,264 | 10/1984 | Kratz et al. | 95/121 X |
| 4,566,282 | 1/1986 | Knoblauch et al. | 426/419 X |
| 4,710,206 | 12/1987 | Allen et al. | 426/419 X |
| 4,817,391 | 4/1989 | Roe et al. | 426/419 X |
| 4,829,774 | 5/1989 | Wassibauer et al. | 426/419 X |
| 4,845,958 | 7/1989 | Senda et al. | 426/419 X |
| 4,961,322 | 10/1990 | Oguma et al. | 426/419 X |
| 5,120,329 | 6/1992 | Sauer et al. | 426/419 X |
| 5,152,966 | 10/1992 | Roe et al. | 426/418 X |
| 5,451,248 | 9/1995 | Sadkowski et al. | 426/419 X |

FOREIGN PATENT DOCUMENTS

| | | | |
|---|---|---|---|
| 0467668 | 1/1992 | European Pat. Off. | 426/418 |
| 0219377 | 3/1985 | Germany | 426/418 |

*Primary Examiner*—Robert Spitzer
*Attorney, Agent, or Firm*—Coleman R. Reap; Salvatore P. Pace

[57] ABSTRACT

A system for controlling the atmosphere within a container, including a plurality of adsorption beds for the selective removal on a cyclical basis and in a predetermined order of at least part of any water vapour, ethylene, carbon dioxide and oxygen components present in the atmosphere in an adsorption phase of the cycle mechanism for controlling the flow of atmosphere within the system and mechanism for desorbing the adsorption beds in accordance with a desorption phase of the cycle.

6 Claims, 1 Drawing Sheet

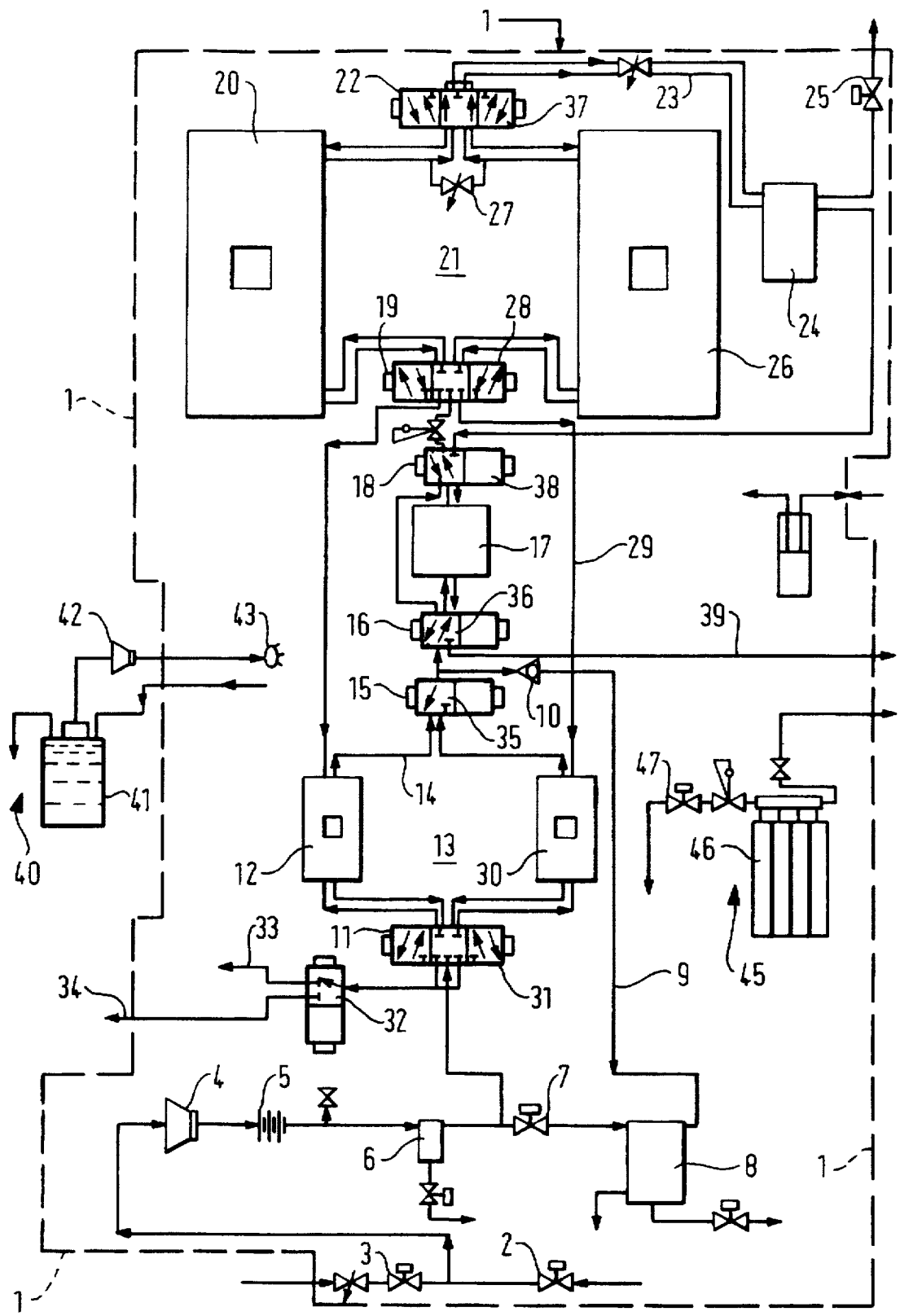

CONTROLLING ATMOSPHERES IN CONTAINERS

BACKGROUND OF THE INVENTION

This invention relates to the storage and transportation of goods and, more particularly, to the provision of atmospheres for the storage and transportation of perishable produce such as fruit, vegetables and flowers.

It is known that such perishable produce can be carried in refrigerated containers, sometimes known as "reefers", and refrigeration units for these containers have been developed to provide a reliable piece of apparatus which can usually function for long periods of time without maintenance.

It is also known that during storage and/or transportation the preservation of perishable produce can be enhanced by controlling the atmosphere surrounding the produce. The use in this respect of an atmosphere in which nitrogen (or other inert gas) predominates is particularly useful. Furthermore, in addition to controlling the amount of oxygen present in the atmosphere, there may be a need to control (but not necessarily eliminate) the amount of other substance which may be present, for example carbon dioxide and any ethylene which might be formed by the produce in situ in the container. In addition the level of water vapour in, ie. the humidity of, the atmosphere may be important; commonly, a relatively high humidity is required.

Although a variety of processes and systems have been proposed for the control of such atmospheres, there remains a need for a reliable system which can preferably be sufficiently compact so as to fit within the confines of a standard container or reefer and which can preferably be varied to suit the requirements of the different types of produce being stored and/or transported.

An important parameter in the design of such processes and systems is their efficiency. The systems commonly employ a series of adsorption beds which can selectively adsorb different components of the atmosphere which can then be desorbed on, for example, a pressure swing or temperature swing, basis and either the non-adsorbed or the previously adsorbed components being returned to the container or vented to atmosphere either wholly or partially. Both pressure- and temperature-swing modes of operation are well documented in the art of air or gas mixture separation in to its component parts; in the first one, adsorption of a gas component of a mixture occurs and high pressure and desorption at lower pressures (including vacuum when appropriate). In the second, gases adsorbed at a lower temperature can be desorbed by raising the temperature, for example gases adsorbed at ambient temperatures can be desorbed at higher temperatures.

Such adsorption/desorption systems, however, do not generally operate to effect a complete separation of each component from the atmosphere but can be regarded as acting on a selective basis. It is therefore important for the number of adsorption processes to be kept to a minimum to minimise the loss of atmosphere components present in the system which are needed to be returned to the container.

SUMMARY OF THE INVENTION

In accordance with the invention, there is provided a system for controlling the atmosphere within a container, comprising a plurality of adsorption beds for the selective removal on a cyclical basis and in a predetermined order of at least part of any water vapour, ethylene, carbon dioxide and oxygen components present in the atmosphere in an adsorption phase of the cycle, means for controlling the flow of atmosphere within the system and means for desorbing the adsorption beds in accordance with a desorption phase of the cycle, wherein the desorption phase is set in respect of ethylene in particular on a selective cycle basis.

The word "container" as used herein includes not only individual containers of "reefers" but also enclosed parts of warehouses, ships' holds and the like.

Ethylene is an important atmosphere component in containers for storing produce. It is commonly formed in the container in situ by the produce itself and it is this gas which can accelerate ripening of the produce. To avoid premature ripening of the produce, it is therefore essential to remove ethylene gas as it is formed. However, the amounts of ethylene produced tend to be small and the invention generally provides a system in which ethylene and the other atmosphere components may be removed and/or adjusted, particularly in use of the preferred features and embodiments of the invention.

In a simple form, a system of the invention comprises a number of adsorption beds, preferably arranged in series for the selective removal of any water vapour, ethylene, carbon dioxide and oxygen, probably for effecting removal in the sequential order recited above and preferably with all the beds operating on a pressure swing basis. Following "removal" from the atmosphere, a component may be returned to the container wholly or in part on desorption or otherwise.

One bed may be used for the adsorption of more than one atmosphere component. In addition, a component to be returned, wholly or in part, to the container may be an adsorbed gas or a non-adsorbed gas.

Generally, however, the container atmosphere is urged in to the system, for example by means of a compressor associated with the system, and the flow is controlled therein by, for example, a series of valves which determines the manner in which the atmosphere passes to and through the different adsorption beds.

As stated above, the beds are preferably arranged in series and the atmosphere is urged through each bed in turn in a predetermined order during the adsorption phase of the cycle. In the desorption phase of the cycle, however, ethylene desorption must be effected selectively, ie. ethylene desorption not occurring during every cycle but only every 'n'th cycle, where n is preferably at least 3 and more preferably at least 5 or 10.

In cases in which desorbed gas from another bed is being used to desorb the ethylene bed, a series of valves can readily be provided operating to ensure that the desorbed gas by-passes the ethylene bed in those cycles when ethylene is not being desorbed and passes through the ethylene bed in those cycles in which ethylene is being desorbed.

The invention is particularly useful in systems in which one or more of the beds is operating as a two-part unit in which, in general, one-part is being used for adsorption whilst the other is being desorbed and vice-versa.

Preferably, the beds for the removal of water vapour, carbon dioxide and oxygen operate on a two-part basis and the bed for the removal of ethylene operates on a one-part basis. In such cases and generally, it is advantageous for the single-part ethylene removal bed to be positioned intermediate between the water vapour removal bed and the carbon dioxide removal bed.

In preferred embodiments of the invention, therefore, there is provided a system operating on a two part basis and comprising in sequential order:

a two part water vapour removal bed,
a one part ethylene removal bed,
a two part carbon dioxide removal bed,
a two part oxygen removal bed wherein the output from both parts of the water vapour removal bed is directed in to the ethylene removal bed and the output from the ethylene removal bed is directed to the relevant part of the carbon dioxide removal bed.

Alternatively, the system may be operated on a three (or more) part basis with each two-part removal bed being replaced with a three (or more)-part bed.

Preferably in such embodiments, the flow of atmosphere by-passes the ethylene removal bed whilst the ethylene bed is being desorbed.

It is possible, and in many cases it is preferably, for the oxygen removal bed of the invention to comprise an adsorbent for the selective adsorption of nitrogen such that the oxygen selectively passes through the bed and removed from the system, in whole or in part, by, for example, venting to atmosphere.

It is also possible, and again may be preferably, for carbon dioxide and nitrogen to be adsorbed in a continuous bed of adsorbent material. Certain zeolite materials, for example those known as Type 13×, can adsorb both carbon dioxide and nitrogen whilst leaving an oxygen residue un-adsorbed. Generally, the carbon dioxide has a greater affinity for such zeolites and is therefore adsorbed much more preferentially than the nitrogen such that, in a typical system, the carbon dioxide will be adsorbed relatively close to the bed inlet with the nitrogen being adsorbed in the remainder of the bed. On desorption of such a bed, for example when the pressure is reduced, it is the nitrogen that is desorbed preferentially in comparison with the carbon dioxide, thereby allowing a possibility of using the desorbed gas stream selectively to adjust the composition of the container atmosphere.

Adsorbent beds of the type which comprise substantially the same composition/structure and which exhibit varying affinities for different components of an atmosphere and which therefore adsorb and desorb the components at different rates and can be used selectively to separate the desorbed components also form part of this invention in their own right and as part of the systems of the invention.

In preferred embodiments of the invention in which water vapour is adsorbed in a first, preferably two-part, bed, ethylene is adsorbed in a second, preferably one-part, bed and carbon dioxide and nitrogen are both adsorbed in a third, preferably two-part bed, it is advantageous to allow the oxygen, wholly or in part, to vent to atmosphere.

In such systems, it is preferred that desorbed nitrogen, followed by any carbon dioxide, from the third bed can by-pass the second (ethylene) bed but pass through the first (water vapour) bed to desorb the water vapour and allow the nitrogen/water vapour/carbon dioxide selectively to be returned either to the container or vented to atmosphere depending on the predetermined requirements for maintaining the produce in the container in good condition.

Every five or ten (or whatever) normal cycles, it will be necessary to desorb the ethylene from its adsorption bed. This is preferably effected by diverting some of the vented oxygen from the oxygen removal bed through the ethylene bed and venting to the external air whilst preferably causing (by valve means) the adsorption stream to by-pass the ethylene bed. In view of the relatively small volumes of ethylene associated with most types of produce, this desorption step will usually be very quickly effected.

BRIEF DESCRIPTION OF THE DRAWINGS

For a better understanding of the invention, reference will now be made, by way of exemplification only, to the accompanying drawing which shows in diagrammatic form a system of the invention.

DETAILED DESCRIPTION OF THE INVENTION

With reference to the drawing, there is shown a system of the invention for use in, or in conjunction with, a container, the outline of which is shown by the dotted line 1.

With valves 2 and 3 open, fresh external air and atmosphere from the container 1 is drawn respectively in to the compressor 4 and thence via an air cooler 5 to a mechanical drier 6.

For the first five minutes from initial turn-on of the system, a valve 7 is open to allow air to enter an air buffer 8 to supply air for the operation of the valves and instruments of the system; thereafter dry air is supplied to the air buffer via the line 9 via a non-return valve 10.

The valve 3 is open for an initial period of one hour, then closed.

The atmosphere flows from the drier 6 through a valve 11 and in to a first part 12 of a water vapour adsorption bed generally denoted at 13 operating on a pressure swing basis and comprising alumina where water vapour is extracted. The dry atmosphere proceeds via a line 14 and valves 15/16 in to a one part ethylene adsorption bed 17 comprising silver substituted Y Type zeolite where ethylene is removed. Dry atmosphere also flows to the air buffer 8 via the non-return valve 10 and the line 9 as described above.

Water vapour- and ethylene-depleted atmosphere then flows via a valve 18 and a valve 19 in to the first part 20 of a carbon dioxide and oxygen removal bed generally denoted at 21 and comprising Type 13× zeolite which adsorbs carbon dioxide (preferentially) and nitrogen (less preferentially) on a pressure swing basis. The predominantly oxygen rich gas leaves the part bed 20 and flows via a valve 22 and line 23 in to an oxygen buffer 24. Rejected oxygen then flows out of the buffer 24 via a valve 25 and is vented to the external air.

Simultaneously with the above described adsorption phase of the cycle, the other parts of the double beds 13 and 21 are being desorbed as follows. Atmosphere is bled from part bed 20 to part bed 26 via an orifice plate 27 to purge the part bed 26 of nitrogen (firstly) and carbon dioxide (secondly).

The purged gases flow via a valve 28 and a line 29 in to the second part 30 of the water vapour bed 13 where it purges the part bed 30 of moisture. The gases then flow via a valve 31 and a valve 32 which can be operated to cause the gases to be selectively returned to the container via a line 33 and/or to the external air via a line 34.

Because of the differential affinity for carbon dioxide and nitrogen exhibited by the 13× zeolite, the nitrogen is desorbed earlier than the carbon dioxide; as a result, a timely switch of the valve 32 between the line 33 and the line 34 can cause a selective routing of these two gases between these two lines, thereby providing a means to deplete or increase the container atmosphere with one or both of these gases.

The above simultaneous adsorption/desorption phases which can be regarded as a half cycle of this double bed system, the cycle is completed as follows.

Atmosphere leaves the compressor 4 and flows via the air cooler 5 and the drier 6 to the valve 31 and thence in to the bed part 30 where moisture is extracted. The dry air then flows via valves 35 and 36 (with a continuing flow to the air buffer 8) in to the ethylene adsorption bed 17 where ethylene is removed.

The water vapour- and ethylene-depleted atmosphere then flows via the valve 18 and the valve 28 in to the bed part 26 of the oxygen removal bed 21 where carbon dioxide and nitrogen are adsorbed. The predominantly oxygen rich atmosphere then leaves the bed part 26 and flows via a valve 37 in to the oxygen buffer 24 and thence to the external air via the valve 25.

Simultaneously with the above described adsorption phase of the cycle, air is bled from bed part 26 to bed part 20 of the bed 21 through the orifice plate 27 to purge the bed part 20 of nitrogen and carbon dioxide. The purged gases flow out of the bed part 20 via the valve 19 and in to the part bed 12 of the water vapour bed 13 where it purges the bed part of moisture.

The gases flow via the valve 11 and the valve 32 and are selectively injected back in to the container or to the external air via the lines 33 and 34 respectively in the manner described above.

In the cycle described above, the ethylene adsorption bed 17 has been substantially continuously been receiving atmosphere either from part bed 12 or part bed 30 of the water vapour bed 13. No desorption of the ethylene bed 17 generally occurs as the purged gases from the oxygen removal bed 21 do not pass through the ethylene bed 17.

However, in a predetermined manner and on a selective cycle basis, for example after ten or twenty such cycles, the valve 25 is closed and a valve 38 is opened and the waste oxygen from the oxygen removal bed 21 is used to purge the ethylene bed 17 and vent the ethylene to external air via a line 39. During the purging, which typically need only take twenty or thirty seconds, the adsorption atmosphere feed between the valves 16 and 18 bypasses the ethylene bed 17.

A moisture injection device generally indicated at 40 and comprising a water source 41, a pump 42 and an atomiser 43 can be provided.

A carbon dioxide injection device generally indicated at 45 and comprising a carbon dioxide source 46 and valve means 47 can also be provided.

Humidity, carbon dioxide and relative humidity sensors are generally employed to detect the various levels of these substances in the container. The system as a whole is therefore well equipped by virtue of its own flexibility and the possibility of utilising external sources to modify the container atmosphere to suit the type of produce being stored or transported.

In the system described with reference to the drawing, the beds 13 and 21 are both operated on a pressure swing basis with the bed parts being a higher pressure during adsorption and at a lower pressure, for example ambient or even vacuum, during desorption.

During the whole of each cycle, the pressure in the ethylene bed 17 can be maintained at the high pressure associated with the adsorption phase of the beds 13 and 21 and reduced only during the selective cycle desorption of the ethylene bed. This leads to greater efficiencies of operation of the system.

We claim:

1. A system for controlling the atmosphere within a container comprising
   (a) a container;
   (b) a first pair of adsorption vessels arranged in parallel, each vessel having an inlet and an outlet and containing a desiccant;
   (c) a single adsorption vessel having an inlet and an outlet and containing an adsorbent which selectively adsorbs ethylene from an oxygen-nitrogen-carbon dioxide gas mixture;
   (d) a second pair of adsorption vessels arranged in parallel, each vessel having an inlet and an outlet and containing an adsorbent which selective adsorbs nitrogen and carbon dioxide from an oxygen-containing gas mixture;
   (e) conduit means for transporting gas between said container and the inlets of said first adsorption vessels;
   (f) conduit means connecting the outlets of said first adsorption vessels with the inlet of said single adsorption vessel;
   (g) conduit means connecting the outlet of said single adsorption vessel with the inlets of said second pair of adsorption vessels;
   (h) purge conduit means connecting the outlets of said first pair of adsorption vessels with the inlets of said second pair of adsorption vessels;
   (i) bypass conduit means, distinct from said purge conduit means, connecting the outlets of said first pair of adsorption vessels with the inlets of said second pair of adsorption vessels;
   (j) means for desorbing ethylene-rich gas from said single adsorption vessel to the atmosphere; and
   (k) means for venting carbon dioxide-enriched gas desorbed from said second adsorption vessels to the atmosphere.

2. A system according to claim 1 further comprising means to operate said first and said second pairs of adsorption vessels alternately, such that one vessel of each pair is in the adsorption mode while the other vessel of each pair is in the adsorbent regeneration mode.

3. A system according to claim 1 further comprising means to direct the flow of gas from the outlets of said first Pair of adsorption vessels directly to the inlets of said second pair of adsorption vessels while the adsorbent in said single adsorption vessel is being desorbed.

4. A system according to claim 1 in which the adsorbent in said second pair of adsorption vessels (d) is such that the oxygen selectively passes therethrough and is removed from the system by venting to atmosphere.

5. A system according to claim 1, wherein said means for desorbing ethylene-rich gas (j) desorbs the adsorbent in said single adsorption vessel no less than every third cycle.

6. A system according to claim 1, wherein said means for desorbing ethylene-rich gas (j) desorbs the adsorbent in said single adsorption vessel no less than every tenth cycle.

* * * * *